April 23, 1929.  A. CLARK  1,710,012
GAS BURNER
Filed June 30, 1927
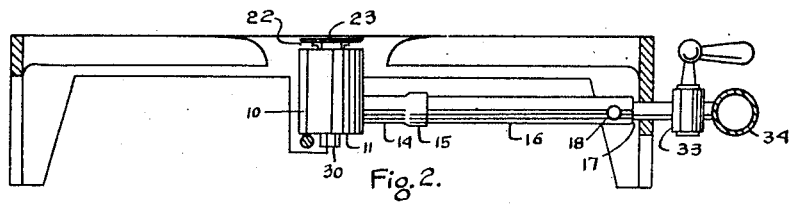
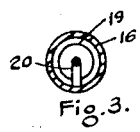
Fig.3.
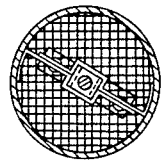
Fig.5.
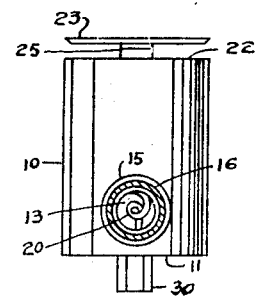
Fig.4.
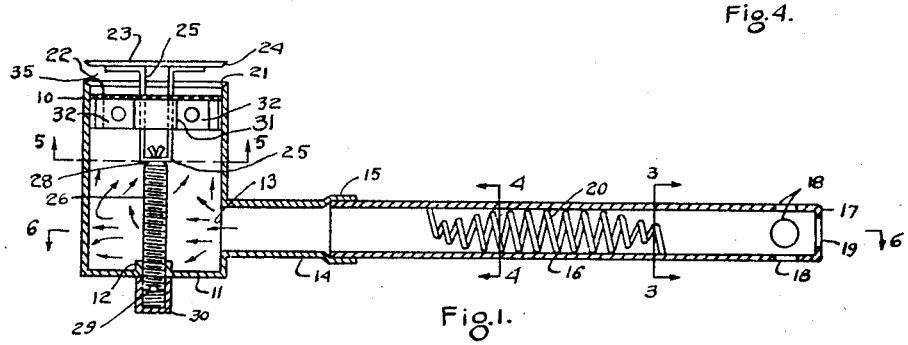
Fig.1.
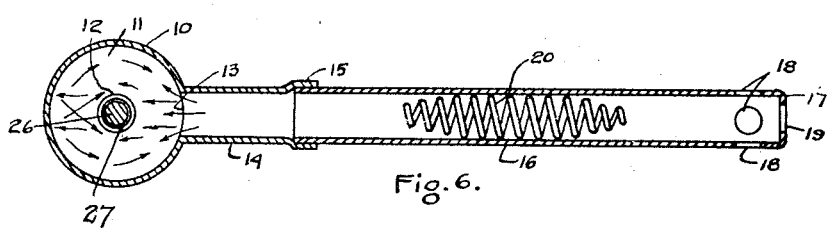
Fig.6.

Patented Apr. 23, 1929.

1,710,012

UNITED STATES PATENT OFFICE.

ANDREW CLARK, OF MONTREAL, QUEBEC, CANADA.

GAS BURNER.

Application filed June 30, 1927. Serial No. 202,610.

The invention relates to a gas burner, as described in the present specification and illustrated in the accompanying drawings that form part of the same.

The invention consists essentially of the novel features of construction pointed out broadly and specifically in the claim for novelty following a description containing an explanation in detail of an acceptable form of the invention.

The objects of the invention are to economize in the consumption of gas; to eliminate the explosions due to the backing up of the flame in the act of turning on or off the gas; to effect a better and a smoother mixture of air and gas and dispense to a considerable extent with the necessity of a large volume of secondary air by completing combustion nearer to the discharge and thereby avoid excessive deposits of carbon on utensils; to reduce the flame to the minimum so that food and other products as well as water can be kept barely warm; to centralize the application of the heating gases and thereby concentrate the heat where most wanted; to enlarge by comparison the capacity of the burner at a given size and to do this in a simple and cheap arrangement of parts; and generally to provide a safe, durable and economical burner cheap to produce and maintain and of the maximum efficiency.

In the drawings, Figure 1 is a vertical sectional view of the burner and a longitudinal sectional view of the mixing chamber.

Figure 2 is a cross sectional view of a simple form of gas stove, showing the burner mounted thereon.

Figure 3 is a cross sectional view of the mixer on the line 3—3 in Figure 1.

Figure 4 is a cross sectional view of the mixing chamber on the line 4—4 in Figure 1.

Figure 5 is a cross sectional view of the burner bowl on the line 5—5 in Figure 1.

Figure 6 is a horizontal sectional view on the line 6—6 in Figure 1.

Like numerals of reference indicate corresponding parts in the various figures.

Referring to the drawings, the bowl indicated by the numeral 10 is here shown as of cylindrical shape, though it may be square, polygonal or any desired shape in cross section. The bottom 11 of the bowl 10 is formed with a central screw orifice 12 and an inlet 13 from which the tubular socket member 14 extends forming a socket 15 for the tubular mixing chamber 16.

The mixing chamber 16 extends outwardly and is slightly contracted at its outer end 17 just beyond the air inlet holes 18 to form the gas inlet 19. The spirally coiled wire 20 in coils diametrically decreasing in size in tapered spring form is inserted in the mixing chamber 16 between the air inlets and the inner end and maintains its position through spring pressure on the inner wall of said chamber, this wire constituting an obstruction about which the stream of gas laden air must pass as soon as the requisite draught is created by the combustion following ignition. This obstruction facilitates the mixing of the air and gas to such an extent as will produce a smooth mixture in which the particles of gas are thoroughly intermingled with the air, thereby reducing the chances of explosion in lighting and extinguishing the heating gases, and at the same time completing combustion through the inflammable nature of the mixture due to its even composition.

The upper end of the bowl 10 is preferably bevelled at the edge 21 to form the annular discharge port 22 between itself and the deflecting plate 23 similarly bevelled at 24 and adapted to be adjustably supported in relation to the bowl for determining the size of the discharge port 22 and thus regulate the volumes of air indrawn through the air holes 18 and consequently governing the degree of richness in the mixture being consumed.

The deflecting plate 23 is supported by a U-shaped bracket 25 and the screw 26, the latter being screwed into the screw orifice 12 in the bottom 11 and inserted through the hole 27 in the bottom of the U-shaped bracket 25.

The screw 26 is reduced at its upper slotted end 28 and spread to retain it in said bracket and at its lower end is formed with the driver slot 29 and capped by the nut 30, which covers the lower slotted end.

The bracket 25 slides in the sleeve 31 rigidly and centrally held by the braces 32 within the bowl 10 and intermediate of the height thereof.

The gas cock 33 is mounted on the contracted end 17 of the mixing chamber 16 and forms the connection to the gas pipe 34 from the source of gas supply.

The wire gauze 35 is a permanent covering within the bowl 10 near to the upper end and this effects a better distribution of the smoothed mixture and further increases the combustibility of the discharge following ignition.

It will be noticed that the mixing chamber 16 and tubular socket member 14 extend at right angles from the bowl 10, slightly above the bottom 11, therefore the mixture entering the bowl does not at once rise to the discharge port, but instead hits the opposite wall surface and is deflected thereby to form a whirl in the incoming stream and this means that any gas not already picked up by the air is surely included in the mixture, thus nullifying all chances of failure in the mixing of the air and gas.

The measure of the cubic contents of the mixing chamber 16 in comparison with the measure of the cubic contents of the bowl 10 is also of great importance and it has been found that the approximate ratio of bowl to mixing chamber is three to one, that is to say, the bowl contains about twelve cubic inches in measurement to about four cubic inches in the mixing chamber of course these dimensions vary according to equipment and in any event are by no means arbitrary.

In operation the gas is turned on and a match or light applied to the discharge port of the burner and the result is the initiation of a constant draught or suction during combustion and as the mixing of the air and gas particles is so perfect, by means of the obstructing wires and deflecting burner wall surface and consequent whirl, a very low flame may be assured and also the utensils can always be brought into extremely close contact with the higher flame, for there is not the great necessity of the auxiliary air so apparent in the average gas burner. The result of this is comparatively little and frequently no carbon accumulation on the utensil, and further the heat is centralized and intense, thereby communicating this heat to the foodstuff, water or other substance quickly and efficiently.

The adjustment of the deflecting plate for fixing the size of the discharge port is done with an ordinary screw driver and the screw head then capped with a nut, or the screw may have a head operable by hand though it is safer to have the adjustment made by some one skilled in the art.

It will be noticed in this burner that the top and particularly the bottom are preferably of flat plate construction so that it really makes a bowl, which is right angular in cross section, and that the mixing chamber forming a stem is at right angles to said bowl. This produces a feed in the gas burner, in fact it produces a feed that sends the stream of gas laden air into the bowl where it whirls around and comes back on itself to further facilitate the mixture, and theoretically then rises due to the suction caused by the vacuum created by combustion.

The burner is supported in the heater frame, so that the flat deflecting plate in its adjusted position will be on or near the same horizontal plane as the vessel supporting surface of said frame, and this is done by eliminating the necessity of secondary air.

What I claim is:—

A gas burner comprising a cylindrical bowl of right angular form in vertical section and a hollow stem projecting therefrom above the bottom thereof and forming a mixing chamber in communication therewith, said bowl having a flat bottom with a central flanged and threaded orifice therethrough, a screen across said bowl adjacent to the upper end thereof, a flame deflecting disk having a central stem extending into the bowl through said screen, an adjusting screw turning in said threaded orifice and pivotally secured to said central stem and a cap and lock nut secured on the projecting end of said adjusting screw.

Signed at Montreal, Canada, this 25th day of May, 1927.

ANDREW CLARK.